Nov. 8, 1955 S. R. HALL 2,722,998
FILTER APPARATUS
Filed March 29, 1952 4 Sheets-Sheet 1

INVENTOR:
STANLEY R. HALL
BY HIS ATTORNEYS
HARRIS, KIECH, FOSTER & HARRIS

Nov. 8, 1955  S. R. HALL  2,722,998
FILTER APPARATUS
Filed March 29, 1952  4 Sheets-Sheet 2

INVENTOR:
STANLEY R. HALL
BY HIS ATTORNEYS
HARRIS, KIECH, FOSTER & HARRIS

Nov. 8, 1955   S. R. HALL   2,722,998
FILTER APPARATUS
Filed March 29, 1952   4 Sheets-Sheet 3

INVENTOR:
STANLEY R. HALL
BY HIS ATTORNEYS
HARRIS, KIECH, FOSTER & HARRIS
By Terence F. Kiech Nov. 8, 1955  S. R. HALL  2,722,998
FILTER APPARATUS
Filed March 29, 1952  4 Sheets-Sheet 4
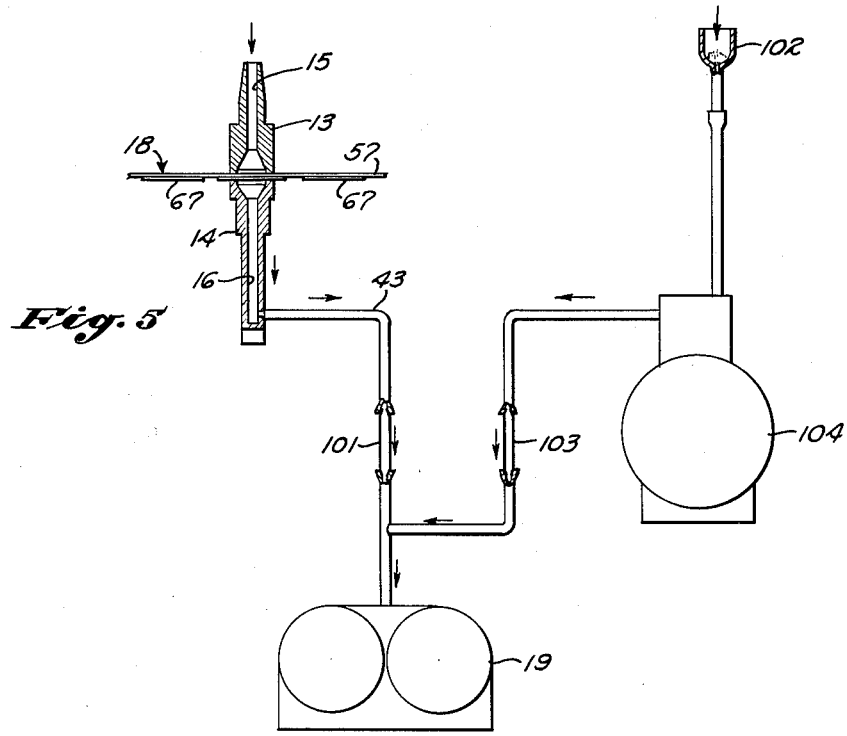
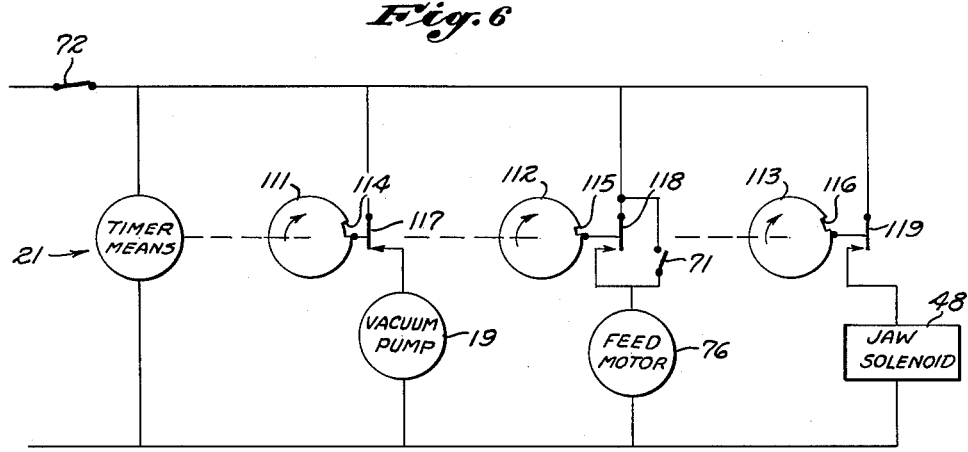
INVENTOR:
STANLEY R. HALL
BY HIS ATTORNEYS
HARRIS, KIECH, FOSTER & HARRIS

2,722,998

Patented Nov. 8, 1955

2,722,998

FILTER APPARATUS

Stanley R. Hall, Burbank, Calif., assignor to Albert L. Chaney, doing business as Albert L. Chaney Chemical Laboratory, Glendale, Calif.

Application March 29, 1952, Serial No. 279,495

14 Claims. (Cl. 183—62)

The present invention relates in general to the filtering art and, more particularly, to a filter apparatus for removing particulates from air and other gases, the filter apparatus of the invention being of particular utility as an air pollution sampler and being considered in such connection herein as a matter of convenience.

In any air pollution investigation or control program, it is essential to obtain data at frequent intervals and over prolonged periods of time before any definite conclusions can be drawn since conditions frequently vary widely from month to month, or even from day to day and hour to hour. In any such program, the concentration of solid particles in the air should be determined on an hourly basis, or on any other suitable time basis, over extended periods of time for comparison with similar time periods in the future. Particulate samples should be taken automatically without the attention of an operator so that it is merely necessary for the operator to pick up the samples at infrequent intervals, the primary object of the invention being to provide a sampling apparatus of the filter type which is capable of doing this.

More particularly, an object of the invention is to provide a filter apparatus which may be stocked with enough filter elements to enable it to collect particulate samples for prolonged periods of time, such as one day, or several days, and which will operate without any attention by the operator so that it is merely necessary for the operator to collect the filter elements with the samples thereon daily, or every few days, and to restock the apparatus with fresh filter elements.

Another object is to provide a filter apparatus having a filter-advancing means for moving successive ones of a plurality of filter elements into sampling position and having timer means for actuating or energizing the filter-advancing means at intervals of, for example, one hour, although other sampling intervals may be employed if desired. With this construction, the exposed filter elements may be collected daily, or at more or less frequent intervals, each filter element retaining the particulate sample obtained during a prescribed interval, such as one hour. The exposed filter elements may then conveniently be taken to a laboratory for study and analysis.

An important object of the invention is to provide a filter apparatus which includes two jaws provided with registering passages one of which is adapted to communicate with a source of fluid to be filtered, such as the atmosphere, one of the jaws being movable toward and away from the other so as to permit closing and opening of the jaws.

Another object is to provide a filter means which is insertable between the jaws so as to be clamped therebetween when the jaws are closed, the jaws and the filter means providing a fluid-tight seal at the juncture of the two passages in the jaws.

Another object is to provide an apparatus which includes pump means for flowing the fluid to be filtered through the passages in the jaws and the filter means clamped between the jaws, the fluid being air in the particular exemplary application of the invention which is being considered herein.

Another object is to provide a jaw-actuating means connected to the movable jaw for moving same away from the other jaw so as to open the jaws and thereby release the filter means to permit advancement of the latter by the filter-advancing means, the jaw-actuating means preferably including a solenoid connected to the movable jaw.

A further object is to provide a filter apparatus wherein the timer means energizes the jaw-actuating means and de-energizes the pump means whenever it energizes the filter-advancing means, thereby interrupting the flow of fluid through the filter means and releasing the filter means from the jaws each time it is advanced.

Another object is to provide a filter means having indexing elements and to provide switch means connected to the filter-advancing means and engageable with the indexing elements for de-energizing the filter-advancing means when the filter means has been advanced the desired distance, thereby providing a positive means for indexing the filter means.

Another object of the invention is to provide a filter apparatus wherein the filter means is tape-like and to provide a filter apparatus having a main or master switch means engageable with the tape-like filter means for de-energizing the entire filter apparatus whenever the end of the tape-like filter means is reached.

While the apparatus of the invention may be operated with a filter means comprising a continuous strip of filter paper, or the like, an important object is to provide a filter means which includes a flexible tape having filter holes therethrough and which includes filter elements carried by the tape and covering the filter holes, the latter being spaced apart longitudinally of the tape. With this construction, successive ones of the filter holes may be aligned with the jaws so that the jaws may be closed on the filter elements covering the holes, the filter elements being filter paper, for example.

Another important object of the invention is to provide filter holes which are larger than the jaws so that the jaws clamp on the filter elements without engaging the tape.

Another and important object is to provide a tape of appreciable thickness so that each hole therein forms a relatively deep well the bottom of which is formed by one of the filter elements. A related object is to deposit the samples on the filter elements within such wells so that the samples are protected. With this construction, the tape with the filter elements thereon may be rolled up after sampling without any danger of destroying or damaging the samples, which is an important feature.

Another important object of the invention is to provide a filter apparatus which includes a filter, a critical flow orifice and a vacuum pump in series. With this construction, the critical flow orifice limits the flow through the filter to a predetermined maximum so long as the vacuum applied does not fall below a predetermined minimum. Consequently, a constant flow rate through the filter is assured, which is important to insure uniform sampling. In other words, if a variable flow rate were permitted, the particulate volume collected would vary with the flow rate, which obviously would be undesirable.

The foregoing objects and advantages of the present invention, together with various other objects and advantages thereof which will become apparent, may be attained with the exemplary embodiment of the invention which is illustrated in detail in the accompanying drawings and which is described in detail hereinafter.

Referring to the drawings:

Fig. 1 is a fragmentary, partially sectional, front elevational view of a filter apparatus of the invention;

Figs. 2 and 3 are enlarged, fragmentary, sectional views respectively taken along the arrowed lines 2—2 and 3—3 of Fig. 1;

Fig. 5 is a diagram showing the fluid flow through the filter apparatus of the invention; and Fig. 6 is a diagram of the electrical circuit of the apparatus.

Figure 1:
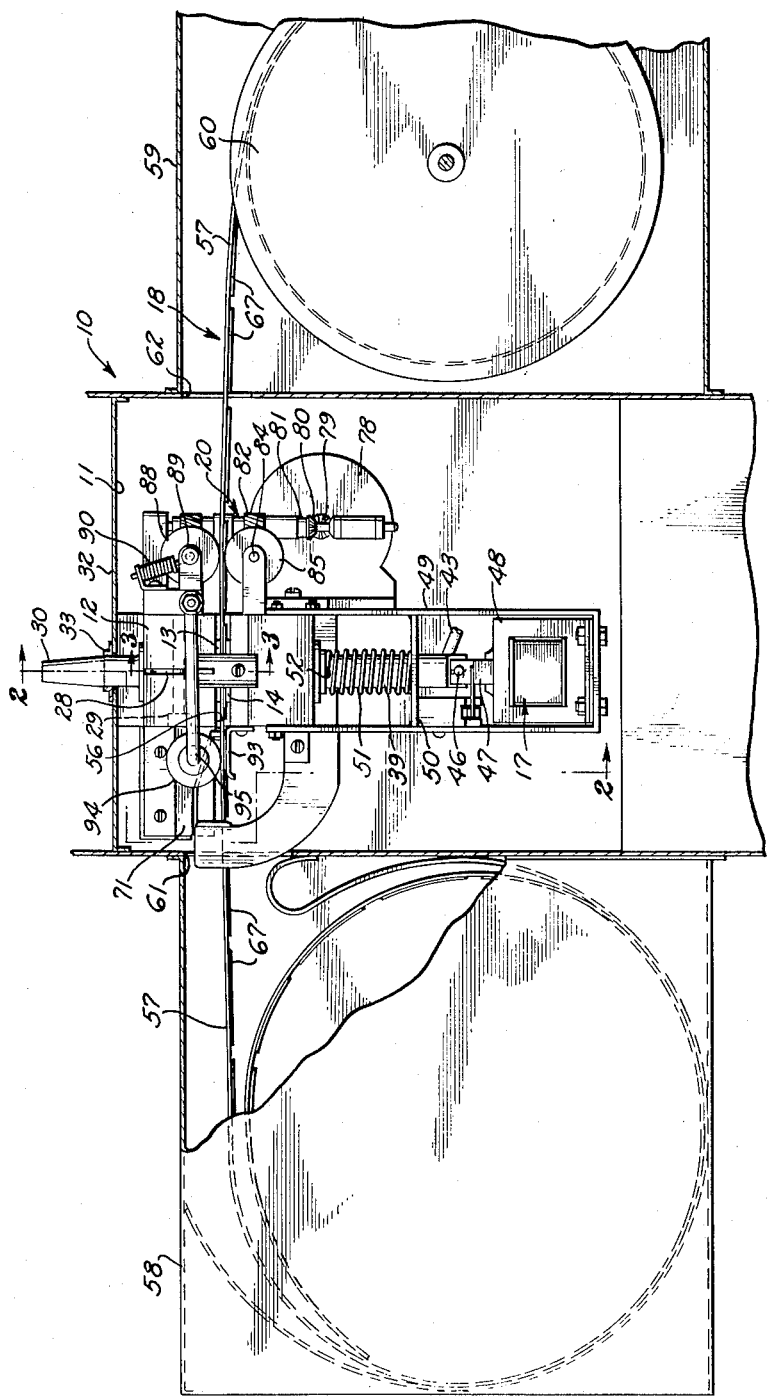

Referring particularly to Fig. 1 of the drawings, the apparatus of the invention illustrated therein includes a housing, indicated generally by the numeral 10, in which various elements of the apparatus are disposed and which serves as a supporting structure therefor, the housing preferably being weather-tight so that the apparatus may be set up in outdoor locations and be operated irrespective of weather conditions. The housing 10 provides a compartment 11 in which is disposed a support 12, the latter being carried by and suitably secured to the structure of the housing. Carried by the support 12 are two jaws 13 and 14 respectively provided with registering passages 15 and 16, the passage 15 communicating with the atmosphere in a manner to be described. The jaw 14 is movable toward and away from the jaw 13, which is preferably stationary, to open and close the jaws, a jaw-actuating means 17 being provided to move the jaw 14 away from the jaw 13 so as to open the jaws. A filter means 18 is insertable between the jaws 13 and 14 so as to be clamped therebetween when the jaws are closed, whereby air may be pumped through the filter means by way of the passages 15 and 16. For this purpose, a pump means, including a vacuum pump 19, Fig. 5, is connected to the passage 16 in the movable jaw 14. The apparatus also includes filter-advancing means 20 carried by the support 12 and engageable with the filter means 18 for moving the filter means relative to the jaws to insert successive areas of the filter means between the jaws, as described in more detail hereinafter. The apparatus further includes timer means 21, Fig. 6, for periodically de-energizing the vacuum pump 19 and energizing the jaw-actuating means 17 and the filter-advancing means 20 so as to insert an unexposed area of the filter means between the jaws 13 and 14, the jaw-actuating means and the filter-advancing means subsequently being de-energized and the vacuum pump 19 being re-energized to collect a particulate sample on the previously unexposed area of the filter means.

The foregoing completes a general description of the structure and operation of the filter apparatus of the invention. The apparatus will now be considered in detail.

Figure 2:
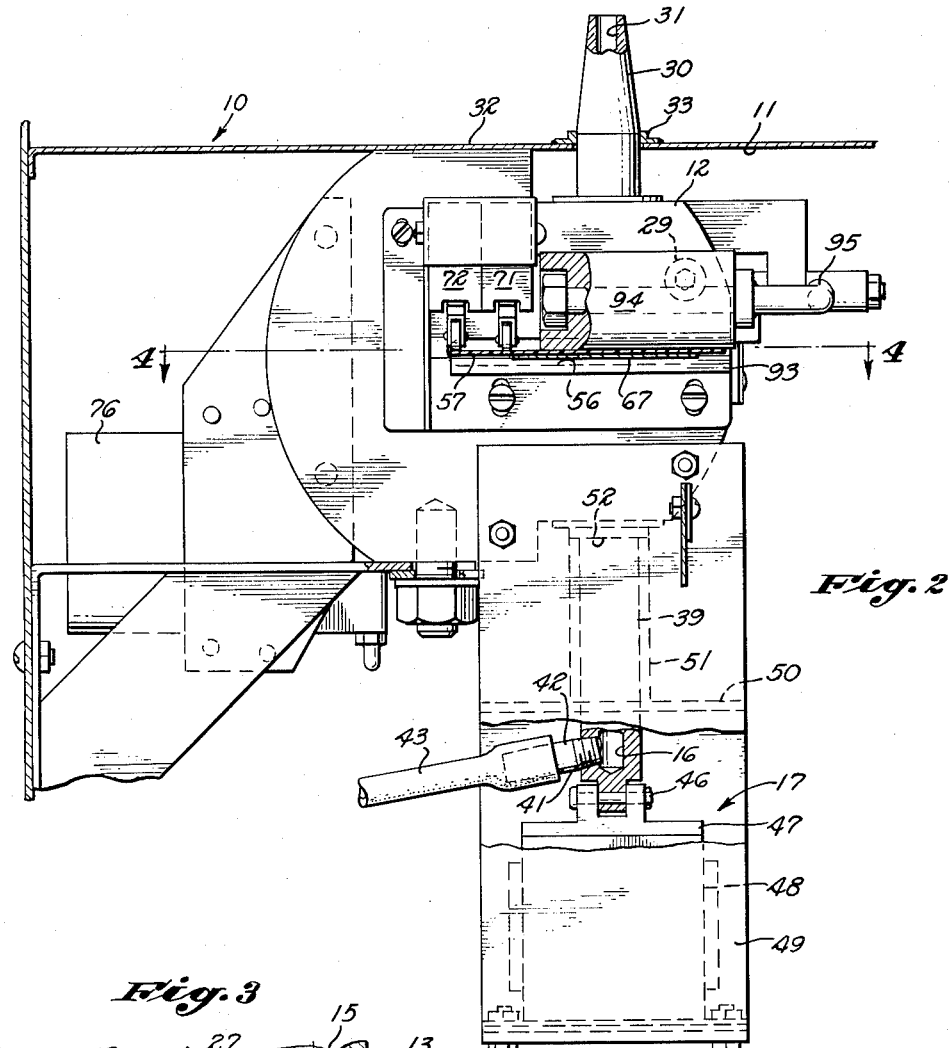
Figure 3:
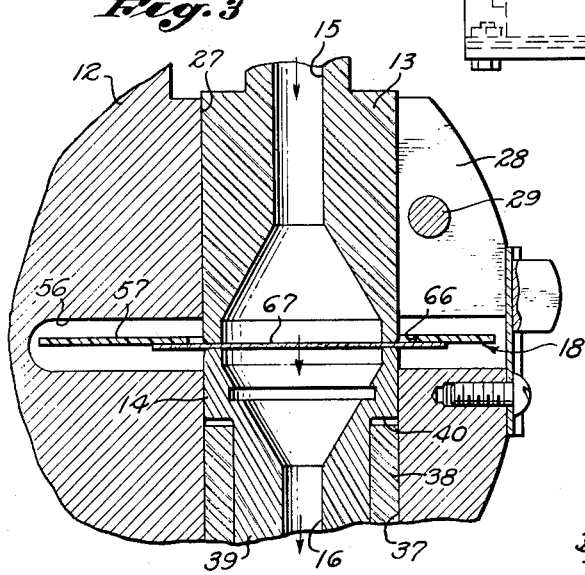

Considering the jaws 13 and 14 and the manner in which they are mounted on the support 12 in more detail, as best shown in Fig. 3, the support is provided with a bore 27 therein for the stationary jaw 13 and is provided with a slot 28 which extends inwardly to the bore 27 so the jaw 13 may be adjustably clamped in the bore 27 by a bolt 29 extending across the slot 28. Secured to the support 12 in alignment with the jaw 13 is a fitting 30, Fig. 2, having a passage 31 therethrough which communicates at its lower end with the passage 15 in the jaw 13, this fitting extending upwardly through an upper wall 32 of the compartment 11 into the atmosphere so as to provide communication between the passage 15 in the jaw 13 and the atmosphere. A seal 33 is provided between the fitting 30 and the upper wall 32.

Continuing to refer to Fig. 3, below and aligned with the bore 27 is a bore 37 into which is pressed a sleeve 38, the movable jaw 14 having a stem 39 which is reciprocable in the sleeve 38. Downward movement of the jaw 14 is limited by engagement of an annular shoulder 40 on the jaw with the upper end of the sleeve 38. The passage 16 of the jaw 14 extends downwardly through the stem 39 and terminates adjacent the lower end of this stem in a lateral bore 41, Fig. 2, into which is threaded a nipple 42, a hose 43 being slipped over this nipple and leading to the vacuum pump 19 in a manner to be described. Connected to the lower end of the stem 39 by a pin 46 is the armature 47 of a solenoid 48, which forms the jaw-actuating means 17. This solenoid is carried by a depending bracket 49 which is bolted, or otherwise secured, to the support 12 at its upper end. Spanning and secured to the bracket 49 is a seat 50 for a compression spring 51, Fig. 1, the upper end of which is seated on an annular shoulder 52 on the stem 39 of the jaw 14, the spring serving to bias the movable jaw 14 toward the stationary jaw 13 to close the jaws. When the solenoid 48 is energized in a manner to be described, it opens the jaws in opposition to the action of the spring 51.

As best shown in Fig. 3, the adjacent or inner ends of the jaws 13 and 14 project into a slot 56 in the support 12, this slot extending across the support, Fig. 1, to permit transverse movement of the filter means 18 across the support and through the slot so as to insert successive areas of the filter means between the jaws. Continuing to refer to Fig. 1, the filter means takes the form of a flexible belt or tape, which may be formed of plastic material, for example. The tape 57 moves from a supply magazine 58 across the compartment 11 into a receiving magazine 59, wherein it may be taken up by a spring reel 60, for example. The tape 57 is preferably relatively heavy so that it is unnecessary to provide a reel in the supply magazine 58, although one may be employed therein if desired. Windows 61 and 62 provide passageways from the supply magazine 58 into the compartment 11 and from the compartment 11 into the receiving magazine 59, respectively.

Figure 4:
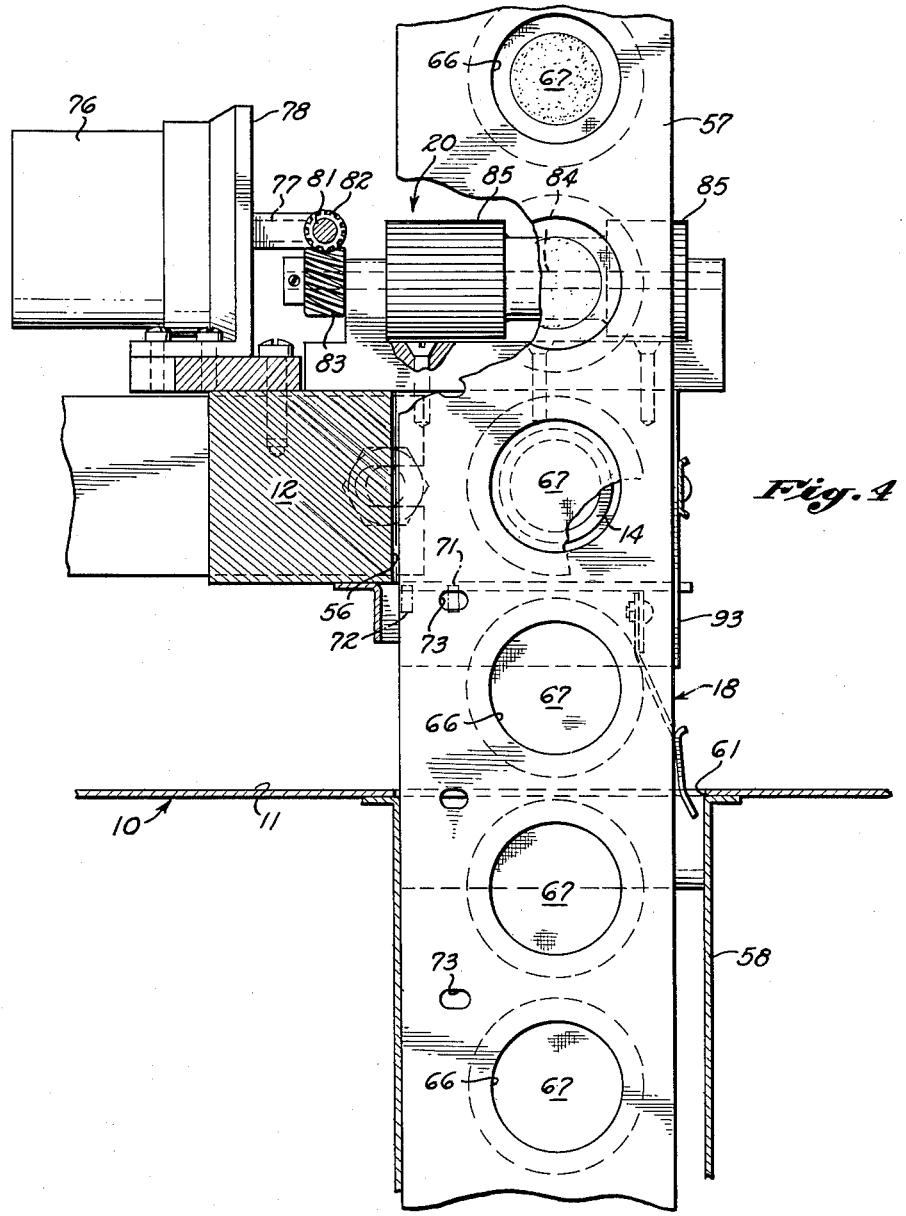
Fig. 4 is a further enlarged, fragmentary, sectional view taken along the arrowed line 4—4 of Fig. 2.

As best shown in Fig. 4 of the drawings, the tape 57 is provided with a plurality of longitudinally spaced filter holes 66 each of which is covered by a filter element 67 carried by the tape on the under side thereof in the particular construction illustrated. Preferably, the filter elements 67 are discs of filter paper lightly adhered to the tape so that they may be removed readily for examination of particulate samples collected thereby. Referring particularly to Fig. 3, it will be noted that the filter holes are larger than the jaws 13 and 14 so that the jaws do not engage the tape 57 when closed, but clamp only the filter elements 67 therebetween. When the jaws clamp one of the filter elements therebetween in this manner, the filter element itself serves as a gasket to insure a fluid-tight seal so that only air passing through the filter element is permitted to enter the passage 16 in the jaw 14.

As best shown in Fig. 3, the tape 57 preferably has appreciable thickness. Consequently, with the filter elements 67 adhered to the lower side of the tape and with the air flow through the filter elements being downward, the particulate samples collected are deposited on the upper surfaces of the filter elements within wells or cups formed by the relatively thick tape. Consequently, the particulate samples collected on the upper surfaces of the filter elements 67 are protected against damage so that the tape may be rolled up and transported to a laboratory, for example, for analysis with a minimum possibility of damage to the samples, which is an important feature of the invention.

As best shown in Fig. 2, engaging the tape 57 and carried by the support 12 are an indexing switch 71 and a limit switch 72, these switches having rollers which engage the tape. The indexing switch 71 is adapted to engage indexing elements 73 spaced longitudinally of the tape 57, these indexing elements being holes in the particular construction illustrated. The switch 71 is actuated to de-energize the filter-advancing means 20 whenever its roller drops into one of the indexing holes 73, the indexing holes being so positioned relative to the filter holes 66 that a filter hole is aligned with the jaws 13 and 14 whenever the roller on the indexing switch drops into the corresponding indexing hole. The limit switch 72 engages the tape 57 adjacent one edge thereof and is adapted to de-energize the entire apparatus when the roller thereof drops off the trailing end of the tape 57. The operation of the switches 71 and 72 will be considered in more detail hereinafter in conjunction with the description of the electrical circuit of Fig. 6.

Considering the filter-advancing means 20, it includes a feed motor 76, Fig. 4, which drives a shaft 77 through reduction gearing 78. The shaft 77 carries a bevel gear 79 meshed with a bevel gear 80 on a spindle 81, as best shown in Fig. 1. Referring to Fig. 4, the spindle 81 carries a helical gear 82 meshed with a helical gear 83 on a shaft 84, this shaft carrying a drive roller 85, which may be serrated as shown. This drive roller has a portion of reduced diameter in registry with the filter holes 66 so that the drive roller does not engage the filter elements 67 in the vicinity of the centers thereof, thereby avoiding any possibility of rupturing the filter elements. As best shown in Fig. 1, on the opposite side of the tape 57, i. e., above the tape in the particular construction illustrated, is a floating drive roller 88 registering with the drive roller 85, the roller being mounted on pivoted arms 89 and being biased downwardly by compression springs 90, only one of which is visible. The springs 90 serve to clamp the tape 57' firmly between the drive roller 85 and the floating roller 88 to prevent slippage of the drive roller relative to the tape.

On the opposite side of the support 12 from the drive rollers 85 and 88 is a plate 93 over which the tape slides in entering the slot 56 through the support 12, this plate being suitably secured to the support. A gravity-actuated roller 94 carried by a pivoted arm 95 registers with the plate 93 and rests on the tape. The rollers 85, 88 and 94 and the plate 93 cooperate to position the tape properly within the slot 56 and relative to the jaws 13 and 14.

Considering the manner in which the vacuum pump 19 is connected to the movable jaw 14, the hose 43 which was described previously is connected to one end of a critical flow orifice 101, as shown diagrammatically in Fig. 5. The other end of the critical flow orifice is connected to the intake of the vacuum pump 19. Thus, by employing a vacuum pump having a flow capacity greater than the critical flow through the critical flow orifice 101, a constant flow rate through the filter elements 67 is maintained since the flow through the orifice 101 cannot exceed the critical value. Thus, as long as the filter elements 67 are exposed for the same length of time, the total air flow through each will be constant so that the amounts of particulates retained by the filter elements are directly comparable.

If it is desired to collect particulates in one filter over a prolonged period of time, such as 24 hours, for example, a second filter 102, which may be a Gooch filter, for example, or any other filter adaptable to weighing, is connected in parallel with the system described previously. A critical flow orifice 103 is interposed between the vacuum pump 19 and the filter 102 to insure constant flow through the filter 102. In order to measure the total air flow through the filter 102, a flow meter 104 is connected in series therewith.

Referring now to Fig. 6 of the drawings, the timer means 21 is shown as including three cams 111, 112 and 113 which are driven through one revolution for each sampling interval. For example, if it is desired to collect particulates on each filter element 67 for a period of one hour, the cams 111 to 113 rotate at a speed of one revolution per hour. The cams 111, 112 and 113 are provided with notches 114, 115 and 116 therein, respectively, into which rollers on switches 117, 118 and 119 are adapted to drop to actuate the switches. The switch 117 is normally closed, i. e., it is closed so long as it is clear of the notch 114, and the switches 118 and 119 are normally open. The switch 117 is connected in series with the vacuum pump 19, the switch 118 in series with the feed motor 76 and the switch 119 in series with the jaw solenoid 48, the vacuum pump, the feed motor and the jaw solenoid being connected in parallel. The indexing switch 71 is connected in series with the feed motor 76 and in parallel with the switch 118. The limit switch 72 is connected in the circuit as a main or master switch for de-energizing the entire circuit.

Considering the operation of the invention, it will be assumed that the various switches are in the positions shown in Fig. 6. Under these conditions, the timer means 21 and the vacuum pump 19 are energized and the feed motor 76 and the jaw solenoid 48 are de-energized. Thus, a particulate sample is being collected on one of the filter elements 67, such filter element being clamped between the jaws 13 and 14. When the cams 111 to 113 complete one revolution, the first thing that happens is that the switch 117 engages the notch 114 and opens, thereby de-energizing the vacuum pump 19. After a short interval, such as a few seconds, the switches 118 and 119 engage the notches 115 and 116, respectively, to energize the feed motor 76 and the jaw solenoid 48, this slight delay being provided to permit dissipation of the vacuum on the lower side of the filter element 67. The jaw solenoid 48 opens the jaws 13 and 14 so that the tape 57 is free to be moved by the filter-advancing means 20, which includes the feed motor 76. As soon as the tape 57 has been advanced slightly, the indexing switch 71 disengages the indexing hole 73 in which it was disposed and is closed. Consequently, the notch 115 may be relatively narrow so that it closes the switch 118 only momentarily. Thereafter, the switch 71 takes over and maintains the circuit to the feed motor 76 until the tape has been advanced to a position wherein the next filter hole 66 is in registry with the jaws 13 and 14. When this occurs, the corresponding indexing hole 73 engages the switch 71 to open the circuit to the feed motor 76, thereby stopping the tape. Thereafter, the notch 116 disengages the switch 119 to de-energize the jaw solenoid 48 and the notch 114 disengages the switch 117 to re-energize the vacuum pump 19. When this occurs, the sampling procedure is initiated and continues until the cams 111 to 113 have completed another revolution, which may require a period of one hour, for example.

In the event that samples have been collected on all of the filter elements 67 on the tape 57, the trailing end of the tape passes the switch 72 and permits the switch to open, whereupon the entire circuit is de-energized. Thus, even if the operator cannot collect the samples on schedule, the apparatus will shut itself off when it runs out of filter elements, which is an important feature.

The samples collected by the apparatus may be taken to a laboratory for study upon removal from the receiving magazine 59, the samples being protected by the filter holes 66 in the tape 57 as hereinbefore discussed so that they may be transported readily. In the laboratory, these samples may be analyzed as desired. Also, if desired, an on-the-site analyzing apparatus may be employed to analyze the samples as they are collected, if desired. For example, an analyzing apparatus, not shown, responsive to radioactivity may be employed to analyze a sample for radioactivity while the next sample is being collected. If desired, the analyzing apparatus may be designed to relay a signal to a control point. However, the samples may be handled in various other ways, the foregoing being illustrative only.

It will be understood that although I have disclosed an exemplary embodiment of my invention herein for purposes of illustration, various changes, modifications and substitutions may be incorporated in the embodiment disclosed without departing from the spirit of the invention.

I claim as my invention:

1. In a filter apparatus, the combination of: a supporting structure; two jaws carried by said supporting structure and provided with registering passages one adapted to communicate with a source of fluid to be filtered, one of said jaws being movable toward and away from the other to close and open said jaws; filter means insertable between said jaws so as to be clamped therebetween when said jaws are closed; energizable pump means carried by said supporting structure and communicating with one of said passages for flowing a fluid to be filtered through said filter means; energizable jaw-actuating means carried by said supporting structure and connected to said movable jaw for moving same away from said other jaw to open said jaws and thereby release said filter means; energizable filter-advancing means carried by said supporting structure and engageable with said filter means for moving said filter means relative to said jaws to insert a fresh area of said filter means between said jaws; and timer means connected to said pump means, said jaw-actuating means and said filter-advancing means for periodically de-energizing said pump means and energizing said jaw-actuating means and said filter-advancing means.

2. A filter apparatus according to claim 1 wherein said filter means includes a member having holes therethrough which are larger than said jaws to provide for closing of said jaws without engagement with said member, said filter means including filter elements carried by said member and covering said holes.

3. A filter apparatus according to claim 1 wherein said filter means includes a member provided with indexing elements, said filter apparatus including switch means connected to said filter-advancing means and engageable with said indexing elements for de-energizing said filter-advancing means whenever said filter means has been advanced a predetermined distance.

4. A filter apparatus according to claim 1 wherein said pump means includes a vacuum pump for drawing the fluid to be filtered through said filter means, said filter apparatus including a critical flow orifice in series with said vacuum pump.

5. A filter apparatus according to claim 1 wherein said filter means includes a tape, said filter apparatus including switch means connected to said timer means, said pump means, said jaw-actuating means and said filter-advancing means and engageable with said tape for de-energizing said timer means, said pump means, said jaw-actuating means and said filter-advancing means when said switch means encounters the trailing end of said tape.

6. In a filter apparatus, the combination of: a supporting structure; two jaws carried by said supporting structure and provided with registering passages one adapted to communicate with a source of fluid to be filtered, one of said jaws being movable toward and away from the other to close and open said jaws; tape-like filter means insertable between said jaws so as to be clamped therebetween when said jaws are closed; energizable jaw-actuating means carried by said supporting structure and connected to said movable jaw for moving same away from said other jaw to open said jaws and thereby release said filter means; energizable filter-advancing means carried by said supporting structure and engageable with said filter means for moving said filter means lengthwise of itself and relative to said jaws to insert fresh portions of said filter means between said jaws; means for energizing said jaw-actuating means and said filter-advancing means; indexing elements spaced apart lengthwise of said filter means; and switch means engageable with said indexing elements and connected to said filter-advancing means for de-energizing said filter-advancing means whenever said switch means engages one of said indexing elements.

7. A filter apparatus according to claim 6 wherein said filter means includes a tape and wherein said indexing elements are holes in said tape.

8. A filter apparatus according to claim 6 wherein said filter means includes a tape, said apparatus including main switch means engageable with said tape, said main switch means being normally open and being held closed by engagement with said tape so that said main switch opens when it encounters the trailing end of said tape.

9. In a filter apparatus, the combination of: a supporting structure; two jaws carried by said supporting structure and provided with registering passages one adapted to communicate with a source of fluid to be filtered, one of said jaws being movable toward and away from the other to close and open said jaws; and filter means insertable between said jaws so as to be clamped therebetween when said jaws are closed, said filter means including a member having holes therethrough which are larger than said jaws to provide for closing of said jaws without engagement with said member, said filter means including filter elements covering said holes and carried by said member and engageable by said jaws.

10. A filter apparatus according to claim 9 wherein said member is thick as compared to said filter elements.

11. A filter apparatus according to claim 10 wherein said member is a tape.

12. A filter device comprising a flexible tape having longitudinally spaced filter holes therein and having longitudinally spaced indexing holes adjacent said filter holes, said filter device including filter elements carried by said tape and covering said filter holes.

13. In a filter device for use in a filter apparatus having two relatively movable jaws adapted to be opened and closed, said filter device being insertable between said jaws and including a flexible tape having longitudinally spaced holes therein which are larger than said jaws, said filter device including discs of filter paper carried by said tape and covering said holes so that one of said discs of filter paper is clamped between said jaws when said jaws are inserted into one of said holes and closed.

14. In a filter apparatus, the combination of: a supporting structure; two jaws carried by said supporting structure and provided with registering passages, said passage in one of said jaws being adapted to communicate with a source of fluid to be filtered and said one jaw being movable toward and away from the other to close and open said jaws; and filter means insertable between said jaws so as to be clamped therebeween when said jaws are closed, said filter means including a member having at least one hole therethrough which is larger than said one jaw to provide for closing of said jaws without clamping engagement of said one jaw with said member, said filter means including a filter element covering said hole and carried by said member, whereby any matter filtered from the fluid by said filter element is deposited on said filter element within said hole.

References Cited in the file of this patent

UNITED STATES PATENTS

| | | |
|---|---|---|
| 2,040,758 | Naugler | May 12, 1936 |
| 2,062,834 | Schwartz | Dec. 1, 1936 |
| 2,076,553 | Drinker et al. | Apr. 13, 1937 |
| 2,312,295 | Dahlman et al. | Feb. 23, 1943 |
| 2,389,435 | Karlstrom | Nov. 20, 1945 |
| 2,516,680 | Culpepper | July 25, 1950 |
| 2,542,198 | Horton | Feb. 20, 1951 |

FOREIGN PATENTS

| | | |
|---|---|---|
| 47,338 | France | Dec. 21, 1936 |
| 647,038 | France | July 24, 1928 |